Dec. 26, 1950 W. M. TOMKINS 2,535,880
CAN ARRANGING AND BAGGING METHOD AND APPARATUS
Filed Oct. 4, 1945 6 Sheets-Sheet 1
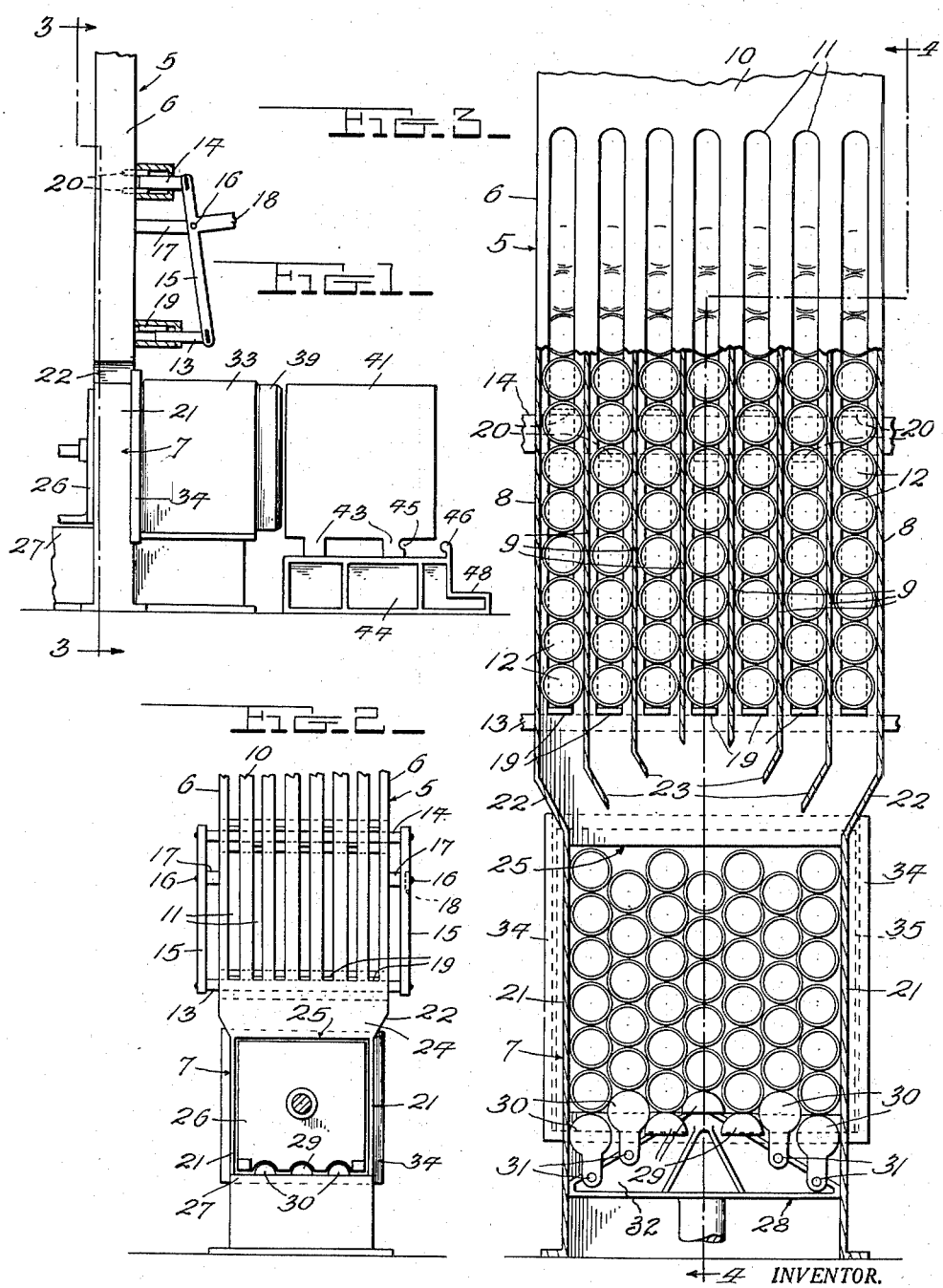
INVENTOR.
Walter M. Tomkins
BY
Mason, Porter & Diller
Attys.

Dec. 26, 1950  W. M. TOMKINS  2,535,880
CAN ARRANGING AND BAGGING METHOD AND APPARATUS
Filed Oct. 4, 1945  6 Sheets-Sheet 2
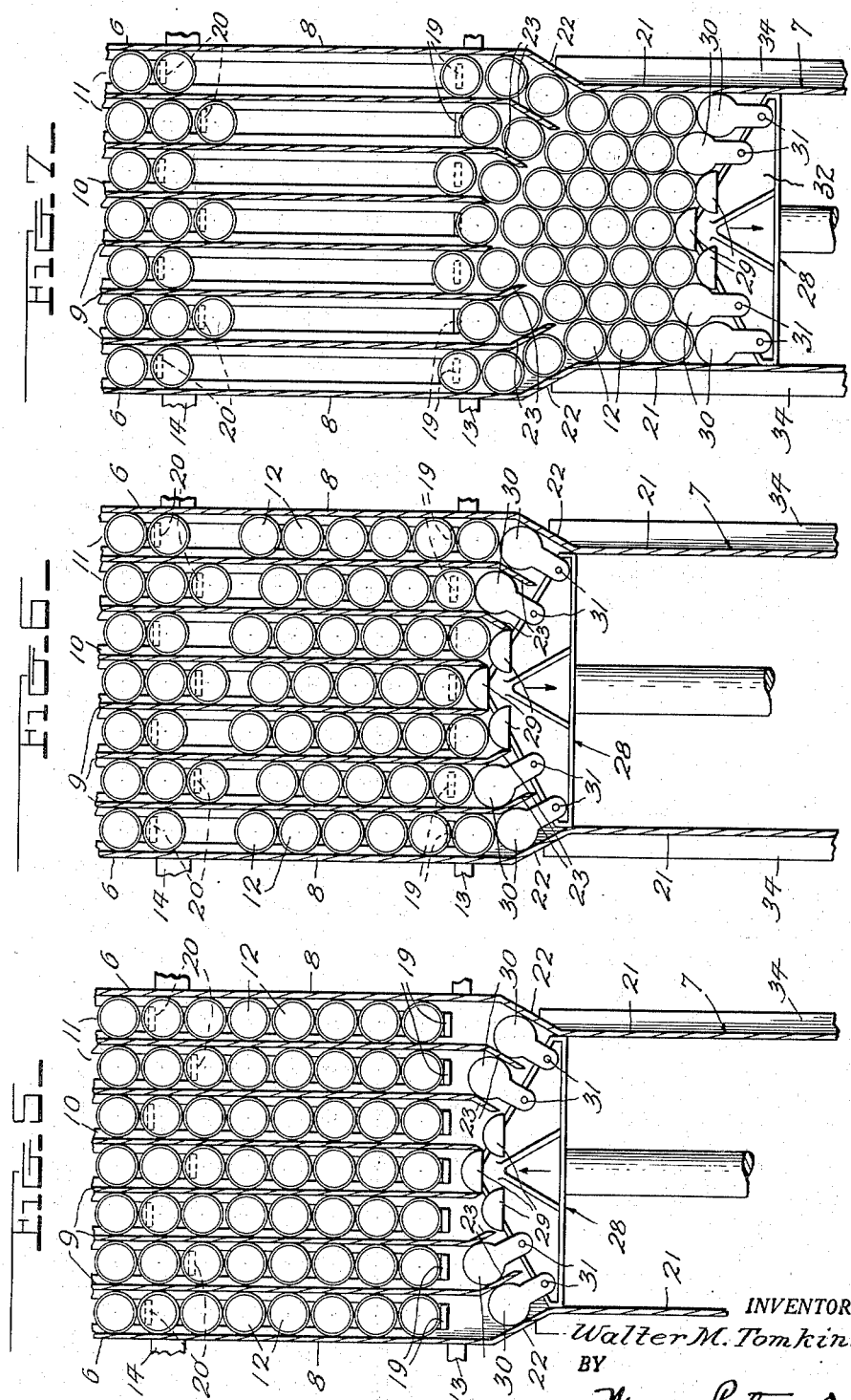
INVENTOR.
Walter M. Tomkins
BY
Mason, Porter & Diller
Attys.

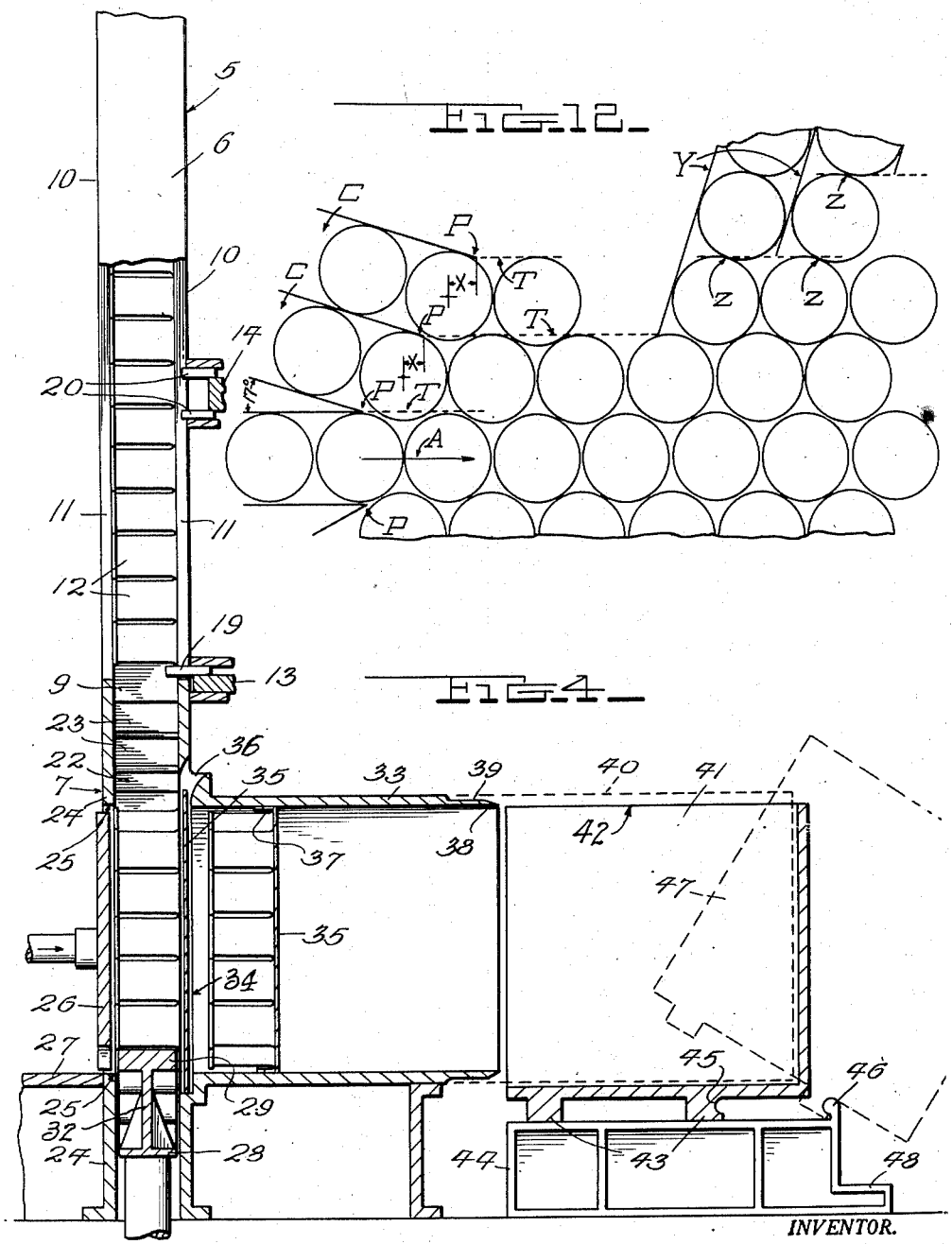

Dec. 26, 1950 W. M. TOMKINS 2,535,880
CAN ARRANGING AND BAGGING METHOD AND APPARATUS
Filed Oct. 4, 1945 6 Sheets-Sheet 4
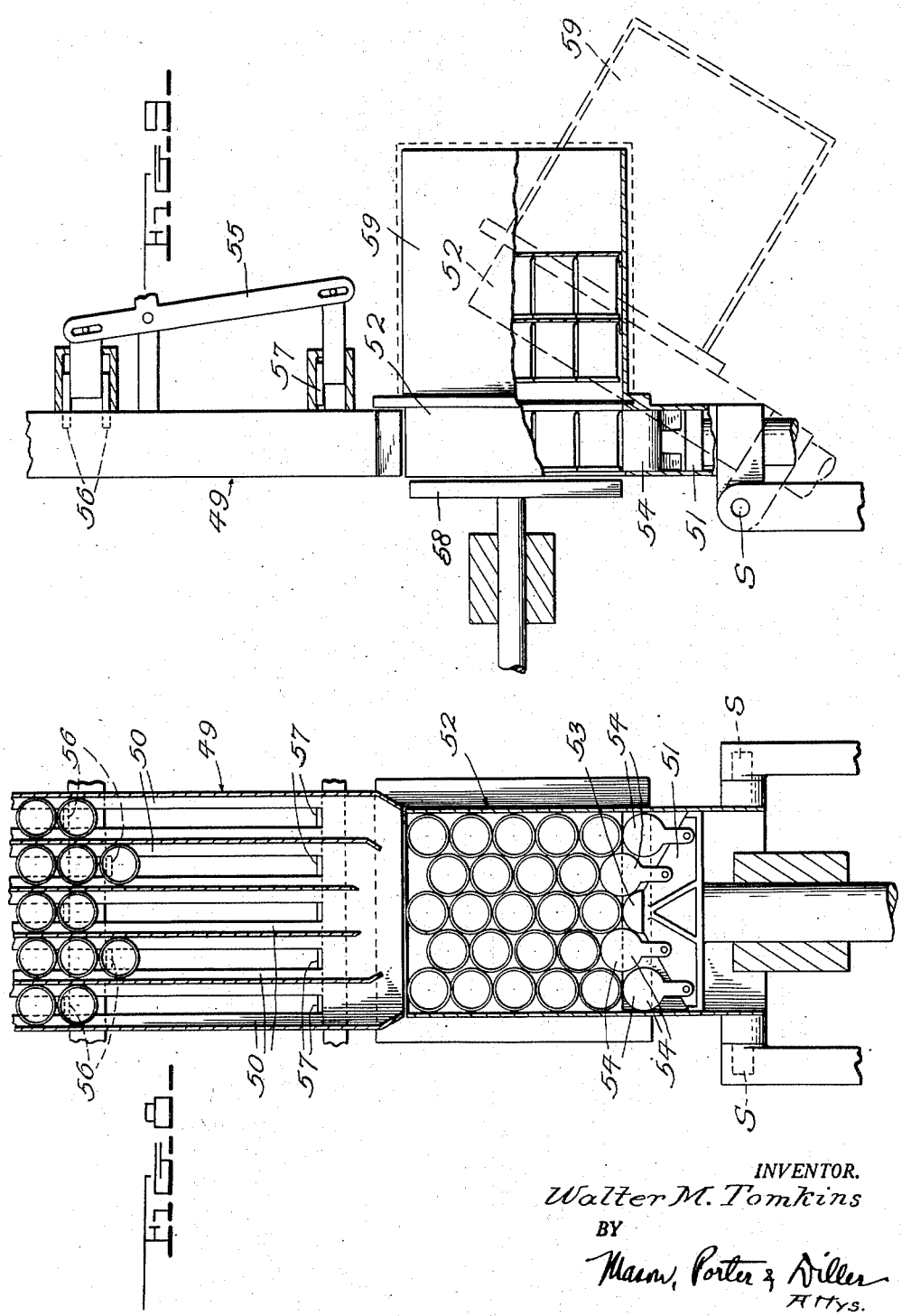
INVENTOR.
Walter M. Tomkins
BY
Mason, Porter & Diller
Attys.

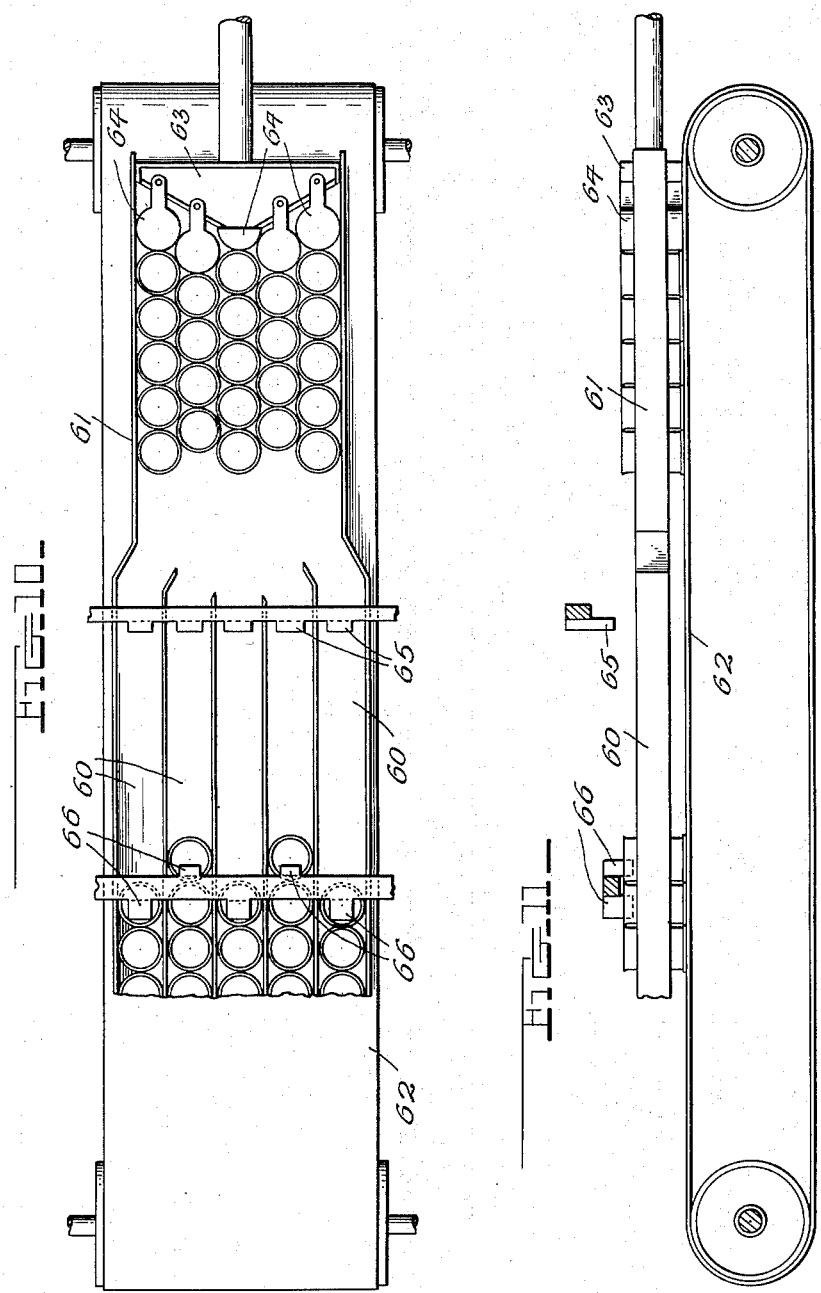

Dec. 26, 1950 W. M. TOMKINS 2,535,880
CAN ARRANGING AND BAGGING METHOD AND APPARATUS
Filed Oct. 4, 1945 6 Sheets-Sheet 6

INVENTOR.
Walter M. Tomkins
BY
Mason, Porter & Diller
ATTYS.

Patented Dec. 26, 1950

2,535,880

UNITED STATES PATENT OFFICE 2,535,880

CAN ARRANGING AND BAGGING METHOD AND APPARATUS

Walter M. Tomkins, Hinsdale, Ill., assignor to Continental Can Company, Inc., New York, N. Y., a corporation of New York Application October 4, 1945, Serial No. 620,359

30 Claims. (Cl. 226—15)

The invention relates generally to the art of manufacturing cans and primarily seeks to provide a novel method of an apparatus for arranging cans in staggered and nested row relation in order to facilitate handling, packaging and storing thereof, and a novel method and apparatus for bag or carton packaging cans which have been so arranged in tier complements, the tier complements of cans being arranged in multiple tiers in the bags or cartons.

In the can manufacturing art great progress has been made in the production of efficiently operating body making and bottoming machinery and cans are manufactured with great rapidity. The production of efficiently operating can handling methods and apparatus have not kept pace, and much wastage of time and labor is entailed in the handling of cans after they have been manufactured. It is commonly known that the labor cost of handling manufactured cans incidental to packaging is greater than the labor cost incidental to the manufacturing of the cans. Workers in the art have long sought, with only limited success, to devise methods and means for arranging cans for handling, packaging and storing which would minimize the wastage of time and labor referred to, and it is an object of the present invention to provide novel methods and apparatus which will accomplish the purpose stated.

It is common to package cans for distribution to the market in cartons or bags, and the cans usually are placed in these receptacles row beside row and tier upon tier. The smooth, light weight cylindriform cans are difficult to handle and problems are presented, not only in the placement of the cans in the receptacles, but also in providing compact, sturdy packages that will not readily break up. When relatively light weight bags constitute the receptacles in which the cans are packaged for the market, the problems of placement and retention in order of the cans is accentuated because of the flexibility of the bag material and the vulnerability thereof to tearing stresses incident to relative movement of the cans and contact of the sharp flanges thereof with the bag material. Therefore it is an object of the present invention to provide novel methods and apparatus for arranging the cans in staggered and nested row relation in can tier complements which can be tightly held together by suitable wrappings or introduced into bag or cartons in multiple, end opposing tiers, or tightly and compactly wrapped in such multiple tiers.

An object of the invention is to provide a novel can arranging method of the character stated in the practicing of which cans are moved into a receiving and confining chamber or way with each can moving in a direction perpendicular to its axis, said cans being guided and controlled as they are so moved so that they are placed in said chamber or way in rows which are in staggered relation and nested with all cans in each row mutually contacting and with individual cans in each row contacting between and with two cans in each adjacent row.

Another object of the invention is to provide a novel method of the character stated in which the cans are fed into the receiving and confining chamber or way in individual rows corresponding in number to the number of rows to be assembled in staggered and nested relation in said chamber or way.

Another object of the invention is to provide a novel method of packaging cans in which tier complements of can assembled and confined in the chamber or way in the manner stated are successively moved from the chamber into end opposing relation in a packaging receptacle.

Another object of the invention is to provide novel apparatus for practicing the method referred to and including means forming the tier complement receiving and confining chamber or way, means for bringing about movement of the cans into said chamber, and means for controlling arrangement of the cans in staggered and nested rows as they move into said chamber.

Another object of the invention is to provide novel apparatus of the character stated in which the can arrangement controlling means includes a reciprocable abutment means against which the can rows move and which is equipped with abutment devices effective to bring about the staggering of the rows in the chamber or way.

Another object of the invention is to provide novel apparatus of the character stated in which there are included means for directing the cans into the receiving chamber or way in a multiple of individual rows corresponding in number to the number of rows to be assembled in said chamber or way, means also being included for controlling successive movements into said chamber or way of just the right number of cans in the respective rows necessary to make up the tier complement to be assembled in staggered and nested row relation in said chamber or way.

Another object of the invention is to provide novel apparatus of the character stated in which the means for bringing about movement of the cans into the chamber or way comprises a gravity chute conveyor.

Another object of the invention is to provide novel apparatus of the character stated in which the means for bringing about movement of the cans into the chamber or way comprises a travelling conveyor.

Another object of the invention is to provide novel apparatus of the character stated wherein the outlets from the can row directing means individually leading into the chamber or way are so disposed as to direct each can delivered therefrom into a space between two contacting cans of a row of cans being delivered from an outlet next adjacent thereto.

Another object of the invention is to provide novel apparatus of the character stated in which the can row directly means comprises a multiple of parallel ways defined by side and separator walls, some of said ways including angularly disposed portions leading to their outlets and effective to impart a lateral component to the cans moving therethrough, and in which the reciprocable abutment has certain of its abutment devices swingably mounted thereon to enable them to move into said angularly disposed way portions.

Another object of the invention is to provide novel apparatus of the character stated in which there is included a thin rigid form shell over which a bag or carton can be telescoped and means for successively pushing assembled tier complements of cans from the assembling chamber or way into end abutting relation in said shell and from said shell into said bag or carton.

Another object of the invention is to provide in an apparatus of the character stated, means for forming a tier sheet receiving slot traversing the path of movement of the can tiers into the shell so that a tier sheet placed in the slot will be carried into the form by a can tier forced thereinto in the manner stated. The invention also comprehends the feature of thus placing tier sheets having marginal portions extending beyond the cross sectional limits of the rigid form so that when the tier sheet and the tier of cans are forced into said form the marginal portions of the sheet will fold back over the can ends in a manner for protecting the bag against damaging contact by relatively sharp edge portions of the cans.

Another object of the invention is to provide in apparatus of the character stated a novel bag holder which is slidably and tiltably mounted in cooperative relation to the rigid shell so that a bag held therein can be slid into position for having the can receiving mouth thereof telescope over the discharge mouth of the rigid form, and so that the holder, after placement of the complement of can tiers therein, can be slid away from the rigid form and tilted to present the open mouth of the bag uprightly in a manner for facilitating closure and removal of the filled bag.

With the above and other objects in view that will hereinafter appear, the nature of the invention will be more fully understood by following the detailed description, the appended claims, and the several views illustrated in the accompanying drawings.

In the drawings:

Figure 1 is a side elevation somewhat diagrammatically illustrating one form of apparatus embodying the invention and in which the can moving means is in the form of a gravity chute conveyor.

Figure 2 is a face view.

Figure 3 is a vertical cross section taken on the line 3—3 on Figure 1, a tier complement of cans being shown assembled in staggered and nested row relation in the receiving and confining chamber or way.

Figure 4 is a vertical cross section taken on the line 4—4 on Figure 3.

Figure 13:
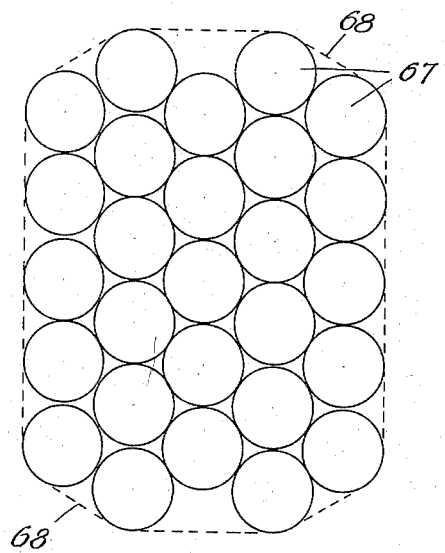
Figure 14:
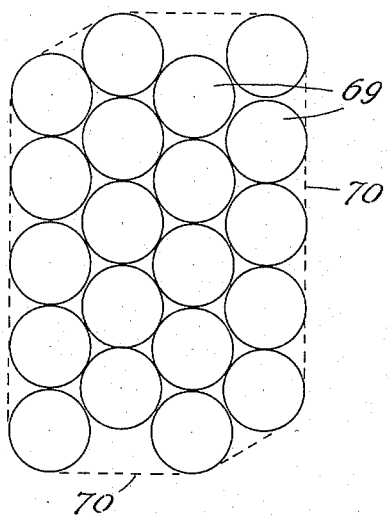
Figure 15:
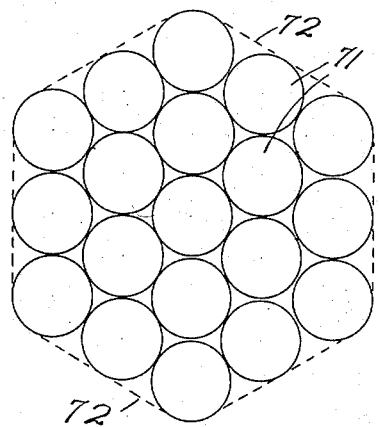
Figure 16:
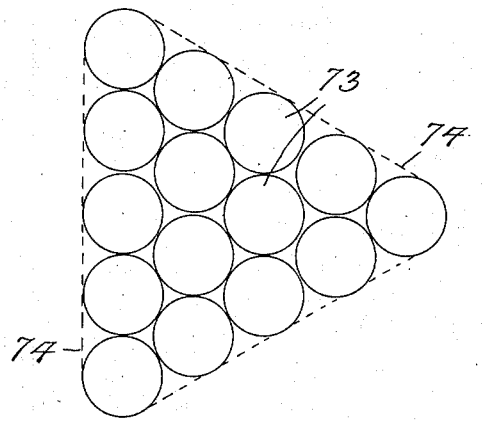

Figure 5 is a fragmentary vertical cross sectional view in which the reciprocable abutment head is shown as moved into position for abutting and controlling the staggering of the can rows as they move into the receiving and confining chamber or way, the stops being shown in position for intercepting and holding the can rows out of contact with the abutment head prior to their movement into said chamber or way.

Figure 6 is a view similar to Figure 5, the stops being positioned to permit a tier complement of can rows to move against the abutment head.

Figure 7 is a view similar to Figures 5 and 6, the stops being positioned as in Figure 6 and the abutment head being shown as moving along in the receiving and confining chamber or way, and the can rows as in the process of being simultaneously staggered and nested as they move into said chamber or way.

Figures 8 and 9 are fragmentary sectional views respectively similar to Figures 3 and 4 and showing a slightly modified form of apparatus in which there is included a thin rigid shell in which to receive the tier complements of cans and over which the packaging bag or carton can be wholly telescoped.

Figure 10 is a somewhat diagrammatic plan view illustrating another modified form of apparatus embodying the invention and in which the can moving means is in the form of a travelling belt conveyor.

Figure 11 is a side elevation illustrating the parts shown in Figure 10.

Figure 12 is a diagrammatic plan view illustrating how the individual can rows can be directed into the receiving and confining chamber or way through guide channels some of which are disposed at only slight angular relation to the direction of movement of the cans in said chamber or way, or at greater angular relations up to but not beyond a ninety degree angular relation.

In the apparatus herein disclosed in Figures 1 through 7 as one example of embodiment of the invention there is included a conveyor chute structure generally designated 5 which is uprightly disposed so that the cans will move downwardly therethrough by action of gravity. The chute structure includes an upper can row feeding portion generally designated 6, and a lower portion generally designated 7 and forming a constricted can row receiving and confining chamber or way.

It is to be understood that while the chute structure 5 is herein disclosed in Figures 1 to 4 in vertical position, it may be placed in any desired inclination sufficient to provide for the desired feeding or movement of the cans by action of gravity.

The upper chute structure portion 6 includes side walls 8 which are spaced far enough apart to provide a plurality, seven being shown, of can row feeding channels or guideways divided by partition walls 9, and front and rear walls 10. The walls 10 may be provided with sight openings or slots 11 through which the positions of the cans 12 within the upright columns or channels can be viewed. See Figures 2, 3 and 4.

A lower cross bar 13 and an upper cross bar 14 extend across one face of the upper portion 6 of the chute structure in parallel and vertically spaced relation, and said cross bars may be connected at their ends by side bars 15 having trunnion members 16 rockably supported in bearing means 17. One or both trunnion members may have crank means 18 attached thereto which may be rocked by any approved means (not shown) to alternately move the upper and lower cross bars 13 and 14 toward and from the upper portion 6 of the chute structure. Stop fingers 19 project from the lower cross bar 13 in position for individually extending as stops into the channels or guideways provided by the partition walls 9, and similar stop fingers 20 project from the upper cross bar 14 in position for projecting into said channels. It will be apparent by reference to Figures 1, 2, 4 and 5 to 7 of the drawings that the lower set of stop fingers 19 are arranged in transverse alignment so that when they are effective in the channels or guideways in the manner illustrated in Figures 1, 3 and 5 they will support the rows of cans in said channels with the centers of all of the lowermost cans in the rows in transverse alignment. It will also be apparent from said figures and Figures 6 and 7 that whenever said lower fingers 19 are projected into the channels or guideways the fingers 20 of the upper set will be retracted from said channels, and vice versa. When the fingers 20 of the upper set are projected into the channels or guideways in the manner illustrated in Figures 6 and 7 they will engage in individual cans in the channels or guideways spaced a predetermined number of cans above the lowermost cans in the rows which have been released by the outward movement of the lower fingers 19 and will support the cans in columns above the released columns, each composed of a predetermined number of cans. The staggering of the fingers 20 of the upper set makes it possible to release tier complements of cans, the alternate individual rows in which are to be composed of different numbers of cans, thereby to enable the desired staggering and nesting of the can rows in the lower portion of the chute structure in a manner to be described hereinafter.

It will be noted by reference to Figures 3 and 5 to 7 of the drawings that the lower portion 7 of the chute structure is constructed so that it is narrower than the upper portion 6 of said chute structure, its side walls 21 being closer together than are the side walls 8 of the upper portion 6, thereby to leave a constricted chamber or way between said side walls 21 which is less in width than the sum of the diameters of seven cans plus the thicknesses of the partitions 9. The upper and lower side wall portions 8 and 21 of the chute structure are joined by downwardly and inwardly inclined side wall portions 22. It will also be noted by reference to said Figures 3 and 5 to 7 of the drawings that each of the partitions 9, except the two centrally disposed partitions is provided with a downwardly and inwardly inclined extension 23. It will thus be apparent that the lower chute structure portion 7 is in the nature of a constricted can row receiving and confining chamber portion, and that the seven individual can channels or guideways of the upper chute structure portion 6 deliver into said chamber portion with those at each side of the centrally disposed channels or guideways converging downwardly thereinto. It will be apparent by reference to Figure 3 that the restricted chamber or way will receive a tier complement of cans only when they are staggered and nested in the manner shown in said figure.

The front and rear walls 24 of the lower chute portion 7 are provided with registering openings 25 to permit passage therethrough of the plunger or pusher member 26 which may be slidable over a shelf 27 and movable through said openings to displace individual can tier complements from the lower portion 7 of the chute structure and force them into a suitable receptacle in a manner which will be described hereinafter.

An abutment member 28 is mounted in the lower end of the chute structure 7 and is vertically reciprocable in the chute structure by operation of any suitable reciprocating means (not shown). The member 28 is provided with three centrally disposed and partially cylindriform fixed abutments 29 which are disposed under the central three channels or guideways in the upper chute portion 6, and there is also provided a partially cylindriform support abutment 30 beneath each of the remaining four can channels or guideways. Each of the abutments 30 is pivotally mounted as at 31 on the web 32 of the member 28. See Figures 3 and 5 through 7. It will be observed by reference to Figure 3 that the abutment elements 30 and 29 are arranged in offset or staggered relation so as to be effective, when abutting a can tier complement, in the manner illustrated in Figures 6 and 7, to bring about a staggered relation of the can rows, that is to arrange said can rows with the center of each can disposed intermediately with respect to the centers of the two adjacent contacting cans in the next adjacent row.

In describing the operation of the apparatus illustrated in Figures 1 through 7 in arranging the cans in tier complements with the can rows in staggered and nested relation, attention is directed to said figures of the drawings and it is to be assumed that the stop fingers 19 and 20 or escapement devices are positioned in the manner illustrated in Figures 3 and 5, and that the can row receiving and confining chamber or way formed between the side walls 21 is empty and that the abutment member with the abutments 29 and 30 thereon is in the lowered position illustrated in Figure 3. In this condition of the parts, the can rows will be supported in the channels or guideways in the upper portion 6 of the chute structure in the manner illustrated in Figure 5.

In the first step in the operation of the apparatus, the abutment 28 is elevated to the position illustrated in Figure 5 so that the fixed abutment members 29 thereof will be disposed in the outlets of the three centrally disposed channels or guideways of the upper chute portion 6, and the pivotal mounting of the abutment members 30 disposed outwardly of said fixed abutment members will permit them to swing outwardly in the inwardly angled portions of the guideways at each side of said first mentioned three guideways. By now rocking the side bars 15, the lower set of stop or escapement fingers 19 can be withdrawn and the set of fingers 20 projected into the channels or guideways and cans therein in the can row supporting positions illustrated in Figures 6 and 7. Removal of the lower stop fingers 19 permits the thus released and separated tier complement of cans to be moved against the staggered abutment members 29 and 30 in the manner clearly illustrated in Figure 6.

By now moving the abutment head 28 downwardly, movement of the can rows of the tier complement will be guided and controlled, and this guiding and controlling function serves to bring about a staggering and nesting of the rows of the tier complement of cans as they move into the lower constricted chamber or way formed between the side walls 21 in the lower portion of the chute structure in the manner clearly illustrated in Figure 7. The staggered arrangement of the abutment members 29 and 30 causes the rows to be staggered, and the particular arrangement of the outlets of the individual guideways or channels serves to bring about perfect nesting of the rows, that is to cause all cans in each row to mutually contact with individual cans in each row contacting between and with two cans in each adjacent row. The novel arrangement and functioning of the parts referred to serves to simultaneously bring about the staggering and nesting of the rows as they move into the tier complement confining chamber or way in the manner clearly illustrated in Figure 7.

While it is preferred that the converging outlets of the can row channels or guideways converge at an angle of 30° with relation to the direction of movement of the can rows in said channels, since it has been found that with the channel outlets disposed in this angular relation the nesting of the cans is very efficiently accomplished, said converging channel outlets may be disposed at lesser or greater angles with relation to said feed direction up to but not exceeding 90°. In this connection, attention is directed to Figure 12 wherein converging channels C are shown which bear only 17° angular relation to the direction of feed indicated by the arrow A. It will be apparent however that as the angle of the converging outlets is decreased, the distance a can must travel over in moving into perfect nesting relation while passing out of the outlet of a given channel will be correspondingly greater as indicated at X in said Figure 12.

It will be apparent by reference to Figure 12 that should channels or guideways disposed at a greater than 90° angle with relation to the feed direction A be provided, as indicated at Y, cans at the outlets from such channels would obstruct free feeding movement of the cans as indicated at Z.

It should also be apparent by reference to Figure 12, and also to Figure 7, that the terminal points P are determined by the point at which a line T drawn tangent to the outer edge of a row of cans moving into the receiving and constricting chamber or way intersects the guide wall of the respective channel or guideway. If the channel wall should extend beyond this terminal point there would be insufficient clearance for the discharging cans to pass. Should the channel wall stop short of this terminal point by more than a mere tolerance, the cans would not be individually and positively guided into the desired compactly nested formation. This particular arrangement of channels or guideways and the terminal points thereof brings about a positive guidance and control of the staggering and nesting of the can rows as distinguished from a pushing and crowding action which results in jamming of the cans.

It will be observed by reference to Figures 1 and 4 of the drawings that the apparatus includes a rigid form 33 which is disposed in registry with the openings 25 in the lower chute structure portion 7, or in other words in position for receiving the tier complements of cans as they are individually displaced from the lower chute portion 7 by manipulation of the pusher or plunger 26. The form 33 is provided with a slotway 34 for receiving a tier sheet 35, the latter being insertible into the slotway through a mouth 36, best illustrated in Figure 4. It will be observed by reference to Figures 3 and 4 of the drawings that the slotway 34 is slightly larger than the cross sectional area of the form 33, so as to receive oversize tier sheets. Just prior to the displacement of each tier complement of cans by manipulation of the pusher 26, a tier sheet is inserted in the slotway in the manner illustrated in Figure 4, and when the tier complement of cans is forced into the form 3 by said pusher, the marginal portions of the sheet will fold over the end edge portions of the cans as at 37. It will be obvious that by successively nesting can tier complements in the lower chute portion 7, and displacing these complements by manipulation of the pusher 26, the form 33 will gradually be filled with a package complement of four tiers of cans. It will also be apparent that the rigid form 33 will maintain the compact, nested relation of the rows or columns of cans in each tier complement, and this maintaining of the nested or compacted nested relation of the can tiers will be aided by the folding over of the tier sheets 35 as at 37.

It will be noted by reference to Figures 1 and 4 of the drawings that the form 33 is provided with a reduced extension 38 adapted to fit within the mouth 39 of a bag 40. The bag is mounted in a holder 41 which is closed at three sides and the bottom and may be open at the upper portion as at 42. The bag holder 41 is slidably mounted as at 43 on a supporting platform 44 and has a fulcrum recess 45 which is engageable with a fulcrum flange 46 provided on said platform. When the apparatus is set up for the filling of a bag, the bag is mounted in the holder 41, and the holder is slid toward the form 33 so as to telescope the mouth 39 of the bag over the extension 38 of the form. After the pusher 26 has been manipulated the number of times necessary to push a full bag complement of can tiers into the form 33, said pusher will again be manipulated to force the whole bag complement of can tiers from the form into the bag 40. The holder is then slid to the right, as viewed in Figure 4, to withdraw the mouth 39 of the bag 40 from its telescoping relation over the extension 38 of the form, and with the holder recess 45 in engagement with the fulcrum flange 46, the holder can be tilted as indicated by the dotted lines 47 to rest the bottom of the holder on the supporting shelf 48 and present the open top of the bag uprightly so as to facilitate closure and removal of the bag. With the bag in the upright position a tier sheet of proper size can be inserted over the uppermost tier of cans and the bag can be closed and sealed in any approved manner. Obviously the closing and sealing of the bag can be effected after the removal thereof from the holder 41 if desired.

In Figures 8 and 9 of the drawings there is illustrated a modified form of an apparatus of the general type illustrated in Figures 1 through 7. In this modified disclosure the chute structure is generally designated 49 and is shown as equipped with only five can row feeding channels or guideways 50 in the upper portion thereof, and the reciprocable abutment 51 which is operable in the can row receiving and confining chamber 52 in the lower portion of the chute structure has a single fixed central abutment 53 and two swingably mounted abutment members 54 at each side thereof.

A rockably mounted escapement mechanism generally designated 55 may be employed and equipped with an upper set of stop fingers 56 which are staggered in the manner previously described, and a lower set of stop fingers 57 which are transversely aligned. The operable sets of fingers 56 and 57 control the releasing of the tier complements of cans to be moved down into the lower or row receiving and confining chamber 52 under control of the downwardly moving abutment 51, 53, 54 in a manner for simultaneously effecting a staggering and nesting of the rows as they move into said chamber in the manner previously described.

In this modified form of the invention, the individual tier complements of staggered and nested can rows assembled in the lower chute structure chamber 52 in the manner described are pushed from said chamber by the reciprocating plunger 58 and are successively presented in end opposing relation in a thin rigid receiving shell 59 over which the packaging bag or carton can be wholly telescoped. It will be apparent that after the individual tier complements of cans are assembled in the shell 59 in the manner illustrated in Figure 9, a pushing of the assembled tier complements of cans toward the right end out of the shell 59 will serve to complete the insertion of the tier complements in the bag or carton and strip the bag or carton from its position over said shell. It is to be understood that the tier separating sheets may be inserted between the successively positioned tiers in the manner described in connection with the form of the invention illustrated in Figures 1 through 7.

If desired, the constricted, way forming, lower portion of the chute structure 52 may be separate from the upper part of the chute structure and swingably mounted as at S to permit swinging away thereof to the dotted line position shown in Figure 9. This swinging away of the lower chute portion will facilitate removal of the filled bag.

In Figures 10 and 11 of the drawings, still another modified form of the invention is illustrated, and in this arrangement of the parts, the can row feeding channels or guideways 60 may be five or more in number, and these and the row receiving and confining chamber or way 61 are horizontally disposed. In this form of the invention the means for bringing about movement of the cans comprises a belt conveyor 62 instead of a gravity chute conveyor, and it will be apparent by reference to Figures 10 and 11 that the moving belt extends under the full length of the tier complement separating section of the channels 60 and also under the full length of the extended row receiving and confining channel or way 61.

The abutment 63 which is horizontally reciprocable in the chamber or way 61 and the abutment members 64 mounted thereon are corresponding in number to the number of channels 60 and the rows of cans which are to be staggered and nested in said chamber or way. In the illustration in Figures 10 and 11 the abutments are the same in number and arrangement as those shown in the form of the invention illustrated in Figures 8 and 9.

The tier complement separating and stopping escapement means operates in the same manner previously described and includes a transversely aligned set of stop fingers 65 and a set of staggered stop fingers 66. The stop fingers 65 and 66 may be mounted on rockable carriers as in the previously described forms of the invention, or they may be mounted on slides which are operated by any approved means (not shown).

It is to be understood that the conveyor belt 62 moves faster than the abutment head 63 when it is controlling movement of the can rows into the chamber or way 61, thereby to not only provide for movement of the can rows, but also for holding said rows against the abutments as they are being simultaneously staggered and nested in their movement into said chamber or way. As in the case of the previously described forms of the invention, the abutment head 63 may be reciprocated in timed relation to the alternated operation of the stop fingers 65 and 66 by any approved means (not shown).

It is to be understood also that in the form of the invention illustrated in Figures 10 and 11, the tier complements of cans arranged side by side in staggered and nested row relation in the chamber or way 61 and on the conveyor belt 62 may be successively removed from said chamber and belt by any approved means (not shown) such as magnets, vacuum cups, mechanical grippers or other devices and placed thereby in a tray, bag, carton or other receptacle.

It is also to be understood that while the present disclosure has to do principally with the arranging and packaging of cans, the invention is not limited to this particular practice but is adaptable as well for the handling and packaging of cylindrical articles other than cans, or other articles which are shaped other than cylindrical, such as structures which are oval or polygonal in cross section.

It will be apparent that the novel method herein claimed can be practiced in any of the several forms of novel apparatus herein disclosed, and also in other forms of apparatus not disclosed herein. In the practicing of the improved method steps, the cans are moved into a receiving and confining way with each can moving in a direction perpendicular to its axis, said cans being guided in their movement into the way so as to be placed in said way in rows which are in staggered and nested relation with all cans in each row mutually contacting, and with individual cans in each row contacting between and with two cans in each adjacent row. The confining way serves to maintain the rows of cans in the way in staggered and nested relation. A feature of the method is the feeding of the cans toward the confining way in a multiple of rows and in tier complements, and shifting the rows relatively in a manner for simultaneously bringing the rows into staggered and nested relation as they are moving in a direction perpendicular to the axes of the cans. The method also comprehends the step of removing the cans in tier complements from the confining way while maintaining the staggered and nested row relation of the removed tier complements, said removal being for the purpose of inserting the tier complements of cans in a bag, carton or other receptacle, or for placing the tier complements of cans upon a suitable support.

It is to be understood that the steps of the method and various component parts of the apparatus herein disclosed as examples of means for practicing the method can be variously modified without departing from the spirit and scope

I claim:

1. In apparatus of the character described, means forming a way wherein to receive and confine a predetermined number of rows of cans side by side in staggered and nested relation, means for simultaneously bringing about movement of said predetermined number of individual can rows into said way, and means controlling movement of the multiple of can rows into said way to effect a simultaneous staggering and nesting of the cans of each row with respect to the cans of the row or rows next adjacent thereto.

2. In apparatus of the character described, means forming a way wherein to receive and confine a predetermined number of rows of cans side by side in staggered and nested relation, means for causing cans to move in individual rows toward said way with each can moving in a direction perpendicular to its axis, and means for so guiding the cans of the respective rows as they are moving into said way as to bring about a staggering and nesting of the cans of each row with respect to the cans of the row or rows next adjacent thereto while the cans continue to move in a direction perpendicular to their axes.

3. Can arranging apparatus comprising means for conveying cans, means for guiding the cans in a plurality of individual rows, a constricted way in which to receive a tier complement of conveyed cans composed of a predetermined multiple of cans from each row of the conveyed cans and with the rows of cans therein staggered and nested, and means effective without change of general direction of the movement of the can rows for bringing the individual can rows together in staggered and nested relation as they move in a direction perpendicular to their axes from the guiding means into said constricted way.

4. Can arranging apparatus comprising means for conveying cans with each can moving in a direction perpendicular to its axis, means for guiding the cans so conveyed in separated rows, means for simultaneously bringing the conveyed and separated can rows together in staggered and nested relation while moving in the direction stated, and means to progressively receive the rows of cans in staggered and nested relation and to preserve said relation.

5. Can arranging apparatus comprising means for conveying cans in a single direction, a plurality of adjoining channels for guiding the cans in separated rows, means for bringing the separated and moving can rows together in staggered and nested relation as they are moving in said single direction, and a constricted way to progressively receive the can rows in staggered and nested relation and to preserve such relation.

6. Can arranging apparatus comprising means for conveying cans in a direction perpendicular to their axes, a plurality of adjoining channels for guiding the cans in separated rows and including outlet portions, means for aligning the separated can rows in staggered relation as they move from said outlet portions in said direction, said outlet portions being so cooperatively constructed and arranged as to guide the separated can rows together into nested relation as they move from said outlet portions, and means to progressively receive the rows of cans in staggered and nested relation and to preserve such relation.

7. In apparatus of the character described, conveyor means for feeding a multiple of side-by-side arranged rows of cans in a single direction and including a row directing portion and a row nesting portion of constricted width, releasable means for intercepting the can rows in said directing portion, a can row arranging means reciprocable over said nesting portion and engageable with released can rows moving into said nesting portion for causing them to assume a staggered and nested arrangement in said nesting portion, and means for moving said arranging means.

8. Can arranging apparatus comprising means for conveying cans, means for guiding the cans in a plurality of individual rows, a constricted way in which to receive a tier complement of conveyed cans composed of a predetermined multiple of cans from each row, releasable means for intercepting the individual can rows against movement toward said constricted way and operable for releasing a tier complement of cans from said intercepted rows for movement into the constricted way, and abutment means movable back and forth over said constricted way and having thereon staggered abutment elements individually engageable with the individual rows of cans for arranging them in staggered and nested relation as they move into said constricted way.

9. Can arranging apparatus comprising means for conveying cans, means for guiding the cans in a plurality of individual rows, a constricted way in which to receive a tier complement of conveyed cans composed of a predetermined multiple of cans from each row of the conveyed cans and with the rows of cans therein staggered and nested, means for bringing the individual can rows together in staggered and nested relation as they move from the guiding means into said constricted way, and an escapement means associated with the row guiding means and operable to control delivery of the can rows into the constricted way in individual tier complements.

10. Can arranging apparatus comprising means for conveying cans in a direction perpendicular to their axes, a plurality of adjoining channels for guiding the cans in separated rows and including outlet portions, means for aligning the separated can rows in staggered relation as they move from said outlet portions, said outlet portions being so cooperatively constructed and arranged as to guide the separated can rows together into nested relation as they move from said outlet portions, and means to progressively receive the rows of cans in staggered and nested relation and to preserve such relation, said aligning means comprising a plurality of abutment elements and means for moving said elements with the moving can rows, said abutment elements being arranged in staggered relation in position for being individually engaged by the moving can rows in a manner for effecting said staggered alignment thereof.

11. Can arranging apparatus comprising means for conveying cans in a direction perpendicular to their axes, a plurality of adjoining channels for guiding the cans in separated rows, means for bringing the separated and moving can rows together in staggered and nested relation, and a constricted way to progressively receive the can rows in staggered and nested relation and to preserve such relation, said conveying means being common to said channels and said constricted way.

12. Can arranging apparatus comprising means for conveying cans in a direction perpendicular to their axes, a plurality of adjoining channels for guiding the cans in separated rows and including outlet portions, means for aligning the separated can rows in staggered relation as they move from said outlet portions, said outlet portions being so cooperatively constructed and arranged as to guide the separated can rows together into nested relation as they move from said outlet portions, and means to progressively receive the rows of cans in staggered and nested relation and to preserve such relation, said aligning means comprising a plurality of abutment elements and means for moving said elements with the moving can rows, said abutment elements being arranged in staggered relation in position for being individually engaged by the moving can rows in a manner for effecting said staggered alignment thereof, said conveying means comprising a travelling conveyor movable at a greater speed than the speed of movement of said abutment elements with said can row so as to constantly tend to hold the moving can rows against said abutment elements.

13. Can arranging apparatus comprising means for conveying cans, means for guiding the cans in a plurality of individuals rows, a constricted way in which to receive a tier complement of conveyed cans composed of a predetermined multiple of cans from each row of the conveyed cans and with the rows of cans therein staggered and nested, said guiding means having terminal outlet portions arranged in generally converging relation at the entrance into the constricted way at least some of which outlet portions serve to impart a lateral movement component to the cans passing therethrough which is effective to facilitate nesting of the can rows as they pass into the constricted way, abutment means movable in the constricted way and effective to align the can rows in staggered relation as they move into said constricted way and as they are moving into nested row relation, and means for moving said abutment means.

14. Can arranging apparatus comprising means for conveying cans, a plurality of adjoining channels for guiding the cans in separated rows, a constricted way in which to progressively receive rows of cans from said channels in staggered and nested relation and to preserve such relation, and means for aligning the rows in staggered relation as they move from said channels into said way, said channels having outlet portions opening into said way some at least of which are angularly disposed with relation to the direction of progression of the can rows in the way so as to impart a lateral movement component to the cans passing therethrough which is effective to facilitate nesting of the can rows as they pass through the outlet portions into said way, and the walls defining the outlet portions of each said channel terminating substantially at points where said walls intersect lines drawn tangent to the near sides of the cans in the corresponding channel row and in the preceding channel row, after such rows have been positioned in staggered and nested relation.

15. In apparatus of the character described, means forming a way wherein to receive and confine a predetermined number of rows of cans side by side in staggered and nested relation, means for simultaneously bringing about movement of said predetermined number of individual can rows into said way, means controlling movement of the multiple of can rows into said way to effect a simultaneous staggering and nesting of the cans of each row with respect to the cans of the row or rows next adjacent thereto, and means for removing successively assembled tier complements of staggered and nested rows of cans from said way for insertion in a receptacle.

16. In apparatus of the character described, means forming a way wherein to receive and confine a predetermined number of rows of cans side by side in staggered and nested relation, means for causing cans to move in individual rows toward said way with each can moving in a direction perpendicular to its axis, means for so guiding the cans of the respective rows into said way as to bring about a staggering and nesting of the cans of each row with respect to the cans of the row or rows next adjacent thereto, and means for removing successively assembled tier complements of staggered and nested rows of cans from said way for insertion in a receptacle.

17. In apparatus of the character described, a conveyor chute having a transverse opening therethrough, means for successively arranging multiple row tier complements of cans opposite said opening with the rows in staggered and closely nested relation, and pusher means for pushing the tier complements of cans from said chute into receptacle wherein said tier complements will be confined with the rows in said staggered and nested relation.

18. In apparatus of the character described, a conveyor chute having a transverse opening therethrough, means for successively arranging multiple row tier complements of cans opposite said opening with the rows in staggered and closely nested relation, a rigid open ended form of a depth for receiving a multiple of can tier complements and arranged with one open end opposite said opening, means for supporting a receptacle with an open mouth opposite the other open end of the form and wherein said tier complements will be confined with the rows in said staggered and nested relation, means for positioning a tier sheet across the form to be pushed thereinto with each can tier complement, and pusher means operable to successively push can tier complements from the chute into the form to collect a receptacle fill of tiers in the form and then to push said fill into the receptacle.

19. In apparatus of the character described, a conveyor chute having a transverse opening therethrough, means for successively arranging tier complements of cans opposite said opening, a rigid open ended form of a depth for receiving a multiple of can tier complements and arranged with one open end opposite said opening, means for supporting a receptacle with an open mouth opposite the other open end of the form, means forming a slotway placed for positioning a tier sheet larger in area than the cross section of the form across the form entrance to be pushed thereinto with each can tier complement with the marginal portions of the tier sheet folding over the entering ends of the cans of the tier complement, and pusher means operable to successively push can tier complements from the chute into the form to collect a receptacle fill of tiers in the form and then to push said fill into the receptacle.

20. In apparatus of the character described, a conveyor chute having a transverse opening therethrough, means for successively arranging tier complements of cans opposite said opening with each complement comprising a multiple of can rows with the can rows staggered and closely nested with the center of each can in a given row centrally staggered with relation to the centers of the cans in adjacent rows, a rigid open ended form of a depth for receiving a multiple of can tier complements and arranged with one open end opposite said opening, means for supporting a bag with an open mouth opposite the other open end of the form, means forming a slotway placed for positioning a tier sheet larger in area than the cross section of the form across the form entrance to be pushed thereinto with each can tier complement with the marginal portions of the tier sheet folding over the entering ends of the cans of the tier complement, and pusher means operable to successively push can tier complements from the chute into the form to collect a receptacle fill of tiers therein with the can rows held in tightly compacted nested relation and then to push said fill into the bag.

21. In apparatus of the character described, a conveyor chute having partitions therein dividing the chute into separate channels wherein rows of cans are supported, means for supporting the rows of cans, said chute having a lower portion devoid of partitions and narrower in width than the upper portion, abutment means for controlling downward movement of a tier complement of cans from the partitioned channels into said lower portion and including abutment members for arranging the rows of cans with the centers of cans in a given row centrally staggered with relation to the centers of the cans in adjacent rows so as to cause the can rows to be compactly nested as they move downwardly into said lower portion, and means for pushing the nested rows of the tier complement of cans off said abutment means and into a receptacle.

22. Can arranging apparatus comprising means for conveying cans, means for guiding the cans in a plurality of individual rows, a constricted way in which to receive a tier complement of conveyed cans composed of a predetermined multiple of cans from each row of the conveyed cans and with the rows of cans therein staggered and nested, means for bringing the individual can rows together in staggered and nested relation as they move from the guiding means into said constricted way, and two sets of stops alternately placeable in position for intercepting movement of can rows in the row guiding means and cooperatively spaced so that when one set is in position for intercepting movement of the can rows the other set will be displaced to leave can rows free to move against said one set, and when said other set is moved into position for intercepting movement of can rows said one set will be displaced to release a tier complement of cans from said row guiding means for movement into said constricted way.

23. Can arranging apparatus comprising means for conveying cans, means for guiding the cans in a plurality of individual rows, a constricted way in which to receive a tier complement of conveyed cans composed of a predetermined multiple of cans from each row of the conveyed cans and with the rows of cans therein staggered and nested, means for bringing the individual can rows together in staggered and nested relation as they move from the guiding means into said constricted way, and two sets of stops alternately placeable in position for intercepting movement of can rows in the row guiding means and cooperatively spaced so that when one set is in position for intercepting movement of the can rows the other set will be displaced to leave can rows free to move against said one set, and when said other set is moved into position for intercepting movement of can rows said one set will be displaced to release a tier complement of cans from said row guiding means for movement into said constricted way, the stops in one of said sets being arranged in transverse alignment and the stops in the remaining set of said sets being staggered, thereby to bring about the successive releasing of tier complements of cans composed of can rows of alternately odd and even numbers.

24. The herein described method of arranging cans in tier complements which consists in moving cans into a receiving and confining way with each can moving in a direction perpendicular to its axis, and guiding the cans as they are being so moved so as to gradually change the relative positions of the cans while they are so moving into said way and place cans in said way in rows which are in staggered relation and nested with all cans in each row mutually contacting and with individual cans in each row contacting between and with two cans in each adjacent row.

25. The herein described method of arranging cans in tier complements which consists in moving a multiple of individual rows of cans into a receiving and confining way with each can moving in a direction perpendicular to its axis, and guiding the rows of cans as they are being so moved so as to gradually change the relative positions of the cans while they are so moving into said way and place cans in said way in rows which are in staggered relation and nested with all cans in each row mutually contacting and with individual cans in each row contacting between and with two cans in each adjacent row.

26. In the herein described method of arranging cans in tier complements and forming a package composed of a multiple of said tier complements, the steps of moving cans into a receiving and confining way with each can moving in a direction perpendicular to its axis, and guiding the cans as they are being so moved so as to place cans in said way in rows which are in staggered relation and nested with all cans in each row mutually contacting and with individual cans in each row contacting between and with two cans in each adjacent row, and successively moving the tier complements thus formed into end opposing relation in a packaging receptacle.

27. The herein described method of arranging cans in tier or like complements which consists in moving a multiple of rows of cans in a direction perpendicular to the axes of the cans, and shifting can rows relatively while they are being so moved in a manner for simultaneously bringing the can rows into staggered and nested relation as they are moving in the manner stated.

28. The herein described method of arranging cans in tier or like complements which consists in moving a multiple of rows of cans in a direction perpendicular to the axes of the cans, and shifting can rows relatively while they are being so moved in a manner for simultaneously bringing the can rows into staggered and nested relation as they are moving in the manner stated, and confining the staggered and nested rows to maintain the staggered and nested relation thereof.

29. The herein described method of arranging cans in tier or like complements which consists in moving a multiple of separated rows of cans in a direction perpendicular to the axes of the cans, and simultaneously effecting a staggering and a moving together of said rows to bring about a staggered and nested relation of the can rows as they are moving in the manner stated.

30. The herein described method of arranging cans in tier or like complements which consists in moving a multiple of separated rows of cans in a direction perpendicular to the axes of the cans, and simultaneously effecting a staggering and a moving together of said rows to bring about a staggered and nested relation of the can rows as they are moving in the manner stated, and confining the staggered and nested rows to maintain the staggered and nested relation thereof.

WALTER M. TOMKINS.

REFERENCES CITED

The following references are of record in the file of this patent:

UNITED STATES PATENTS

| Number | Name | Date |
|---|---|---|
| 1,042,200 | Caughrean | Oct. 22, 1912 |
| 1,709,189 | Radtke | Apr. 16, 1929 |
| 1,935,409 | Mudd | Nov. 14, 1933 |
| 2,254,097 | Wood | Aug. 26, 1941 |
| 2,345,560 | Albertoli | Apr. 4, 1944 |
| 2,470,795 | Socke | May 24, 1949 |